United States Patent [19]

Claxton

[11] 4,086,564
[45] Apr. 25, 1978

[54] ELECTRONIC ALARM CIRCUITRY

[75] Inventor: William Eugene Claxton, Mogadore, Ohio

[73] Assignee: The Firestone Tire & Rubber Company, Akron, Ohio

[21] Appl. No.: 581,392

[22] Filed: May 27, 1975

[51] Int. Cl.² .................................... B60C 23/02
[52] U.S. Cl. .......................... 340/58; 200/61.22
[58] Field of Search .............. 340/58, 267 R, 268, 340/271, 366 D, 373, 383; 200/61.22, 61.23, 61.25, 61.26

[56] References Cited

U.S. PATENT DOCUMENTS

| | | | |
|---|---|---|---|
| 3,222,642 | 12/1965 | Berill | 340/58 |
| 3,436,637 | 4/1969 | Ehret | 340/271 UX |
| 3,462,735 | 8/1969 | Hawes | 340/58 |
| 3,990,041 | 11/1976 | Blanchier | 340/58 |

Primary Examiner—Alvin H. Waring

[57] ABSTRACT

An electronic device for indicating an abnormal condition in a rotatable member. A typical use for such a device would be for the detection of a low pressure condition in a tire on a vehicle. In the preferred form for this typical use, a reflecting surface, such as a mirror, is affixed to the wheel and associated with a pressure sensitive device. A light source reflects light off the mirror upon each revolution of the tire which is received by a photo-transistor. A timing device in the form of a retriggerable monostable multivibrator is triggered by the photo-transistor and puts out a high signal for a predetermined period of time. As long as the timing device receives triggering signals at time intervals less than that predetermined period of time, the output of the timing device will remain high and no alarm will be given. If a low pressure condition exists, the pressure sensitive device will move the mirror to misalign it with the light source such that the phototransistor does not give a triggering signal to the timing device within the predetermined period of time. Then an alarm, such as a buzzer and/or light, will alert the operator of the abnormal pressure condition. Means can be provided to prevent false alarms should the wheel be moving at a very slow speed such that one revolution thereof would exceed the predetermined time period of the timing device. In addition, means are also provided to prevent false alarms should the reflective surface coincidentally line up with the light source when the vehicle is stopped.

21 Claims, 7 Drawing Figures

ELECTRONIC ALARM CIRCUITRY

BACKGROUND OF THE INVENTION

This invention relates to an apparatus which electronically indicates an abnormal condition in a rotatable member or plurality of rotatable members. The invention has particular applicability in detecting a low pressure condition in the tires of a vehicle while in operation.

Many devices which include rotating members employ apparatus to monitor the rotating member to alert the operator of an abnormal condition. For example, in certain machinery it is highly desirable to maintain the speed of rotating members within close tolerances. Usually, governors, regulators, synchronous speed control devices or the like are used for such purposes. But these devices can be expensive and are not universally adaptable for all applications.

Another abnormal condition in a rotatable member which should be monitored includes the pressure of an inflatable member such as a pneumatic vehicle tire. An undetected low pressure condition in a tire is not only a hazard to the safe operation of the vehicle but also is detrimental to the tire itself. Such low pressure may go undetected for hours in situations involving long trips or the like.

A number of electronic devices have been employed to detect such a low pressure condition, but all have their drawbacks. For example, in one type of device, a low pressure condition is sensed by counting tire revolutions and comparing such revolutions with the revolutions of a properly inflated tire to determine if one tire has a smaller diameter than the properly inflated tire which would be indicative of a low pressure condition. However, in the increasingly popular radial tire, a tire where pressure tolerance is highly important, there is little deflection under a low pressure condition such that this method would be relatively unworkable. Similarly, in the newly developed cast tire there is very little deflection change related to pressure.

Numerous other devices use radio circuits to warn of a low pressure. These devices usually require power sources at each wheel to operate a transmitter with the receiver being in the cab of the vehicle. When a low pressure condition is detected, the transmitter is activated to warn the operator. Such operation is highly susceptible to false alarms from other transmitters or system failure due to the fact that the electromagnetic waves can be blocked by the metallic portions of the vehicle body, particularly in the situation involving a tractortrailer.

More recently ultrasonic type devices have been used to indicate a low pressure condition. But again these devices are susceptible to spurious activation. In short, none of these devices are failsafe, fully testable, and substantially free of maintenance problems.

SUMMARY OF THE INVENTION

It is thus a primary object of the present invention to provide an electronic device for detecting an abnormal condition in a rotatable member.

It is another object of the present invention to provide a device, as above, which is particularly suitable for detecting a low pressure condition in a pneumatic tire on a vehicle and providing an alarm upon the detection thereof.

It is a further object of the present invention to provide a low pressure detection device, as above, which is operable when the vehicle is traveling at high speeds or low speeds and which will not give false alarms when the vehicle is stopped.

It is yet another object of the present invention to provide a low pressure detection device, as above, which is operable in conjunction with a plurality of tires to indicate in which tire or tires the low pressure condition exists.

It is still another object of the present invention to provide a low pressure detection device, as above, which is fully testable, failsafe and therefore highly reliable.

It is a still further object of the present invention to provide a low pressure detection device, as above, which does not rely on deflection of the tire thereby rendering it suitable for all varieties of tires.

It is an additional object of the present invention to provide a low pressure detection device, as above, which does not require a power source at each vehicle wheel.

These and other objects of the present invention, which will become apparent from the description of the preferred embodiment, are accomplished by the means hereinafter described and claimed.

In general, an apparatus for indicating an abnormal condition in a rotatable member, such as low pressure in a tire or improper speed of a machine element, includes a sensing device which either provides a periodic signal indicative of a normal condition or a second signal indicative of an abnormal condition of the rotatable member. A retriggerable timing device receives the output of the sensing device. If receiving the periodic output, the timing device will provide an output signal indicative of a normal condition of the rotatable member as long as the periodic signals are received within a predetermined time period established in the timing device. If receiving the second output of the sensing device, which is a low or essentially no signal, the timing device provides an output signal indicative of an abnormal condition. This second output activates an indicating or alarming device, such as light and/or buzzer, to alert the operator of the abnormal condition.

DESCRIPTION OF THE PREFERRED EMBODIMENT

Figure 1:
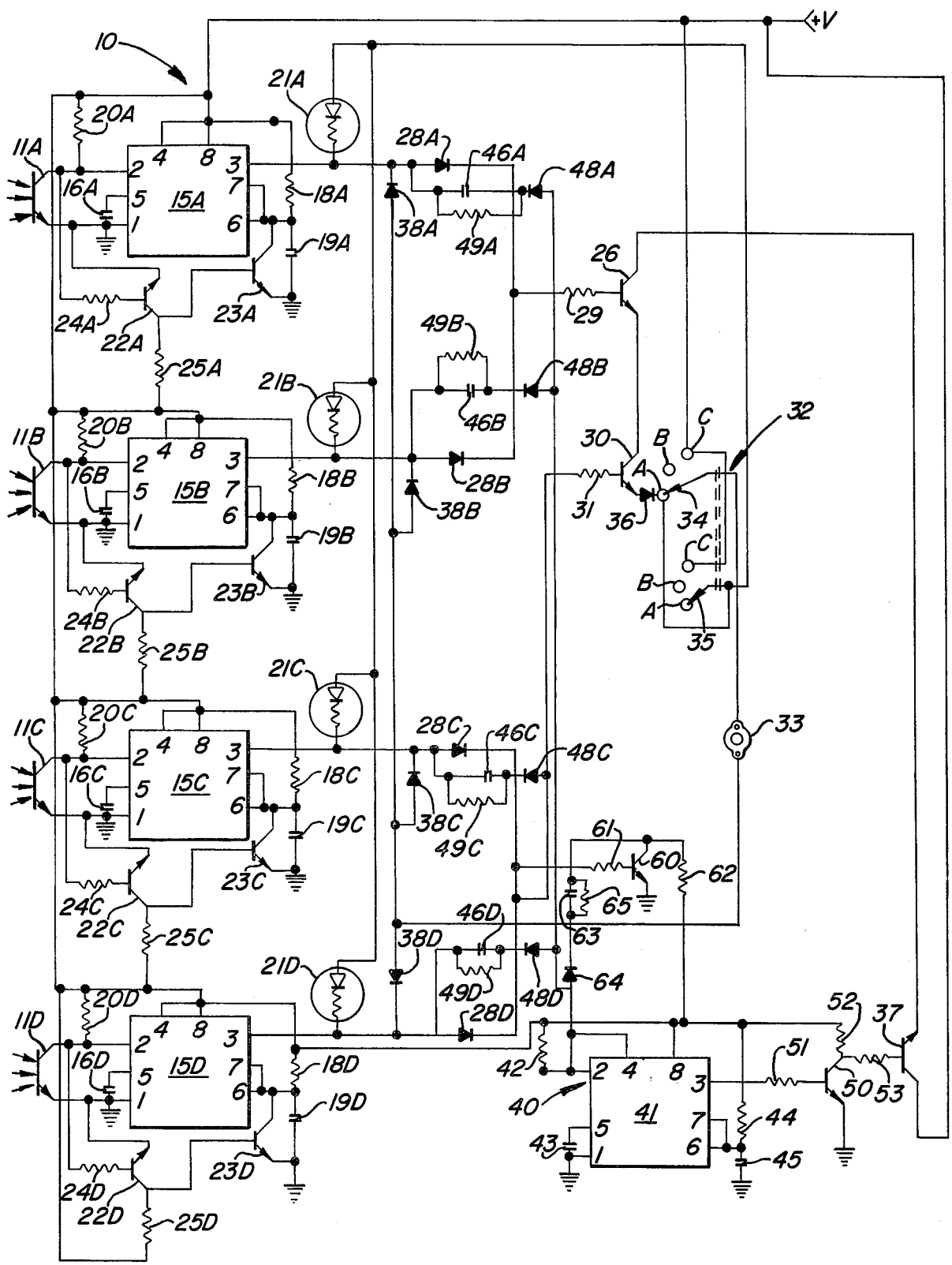
FIG. 1 is a circuit diagram showing the apparatus of the present invention as it would be used to monitor the abnormal condition of low pressure in four tires on a vehicle.

The apparatus for detecting abnormal conditions in a rotatable member is indicated generally by the numeral 10 in FIG. 1. While apparatus 10 would be useful to monitor a variety of conditions in a variety of rotatable members, as will hereinafter be evident, it is shown in FIG. 1 in its preferred form, that is, for monitoring for low pressure conditions in four pneumatic tires on a vehicle. Because apparatus 10 as shown is designed to monitor four tires, portions of the circuitry are identically repeated four times. For purposes of clarity herein, these elements will be referred to by the same number with the number being followed in the drawings by a letter designation, those elements carrying the letter A being associated with, for example, the left front tire, those carrying the letter B being associated with, for example, the right front tire, those carrying the letter C being associated with, for example, the left rear tire, and those carrying the letter D being associated with, for example, the right rear tire. Thus, four switching devices 11 indicated in the drawings by the numerals 11A, 11B, 11C, and 11D, are, as will hereinafter be described in conjunction with FIGS. 2–5, located at or near their respective tires. In the preferred form, switching devices 11 are conventional phototransistors which, if the tire is properly inflated, receive a flash of light on each revolution of the tire.

Figure 2:
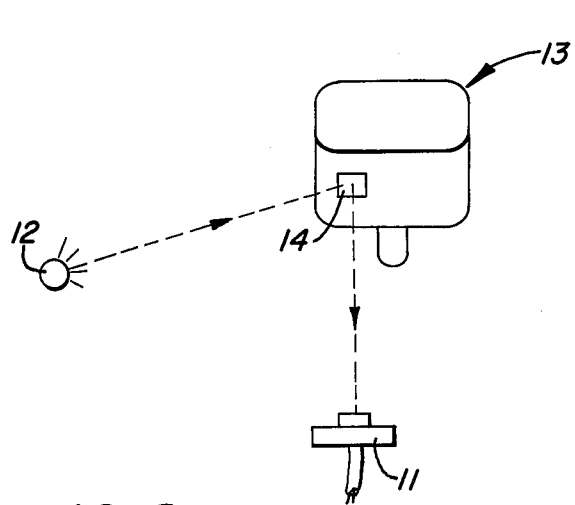
FIG. 2 is a pictorial illustration of one manner in which the present invention senses the abnormal condition from the rotatable member.

As shown in FIG. 2, each photo-transistor 11 is mounted together with a light source 12 adjacent the rotatable member on a nonrotating structure. An optical pressure sensitive switch, indicated generally by the numeral 13, is mounted on each rotating wheel and communicates with the internal air pressure of the tire. A reflecting surface 14, such as a mirror, is built into the optical pressure switch 13 and changes its orientation when the internal pressure in the tire drops below a preselected value. Under normal pressure conditions, the beam of light from source 12 reflects off reflecting surface 14 and strikes photo-transistor 11 once per wheel revolution.

The collector of each photo-transistor 11 is connected to the trigger input (pin 2) of a conventional timing circuit 15 which are available from a number of commercial sources, carrying device No. 555. As is well known in the art and described in literature provided by the manufacturers of these devices, each timing circuit 15 has eight input or output pins so that it may be used for a plurality of functions. The numbers in the blocks labeled 15A, 15B, 15C and 15D in FIG. 1 represent these pin connections. Pin 8 is connected to a power supply, typically 12 volts provided by the battery of the vehicle; pin 1 is grounded; pin 5, which is not used in this application, is grounded through capacitors 16; pin 4 which has the function of resetting circuits 15 is likewise not used in this application and is merely tied to pin 8; pins 6 and 7 are connected to the intersection of the timing resistance-capacitance components 18 and 19, respectively; and pin 3 represents the output of each timing circuit 15. Circuits 15 are thus wired essentially as monostable multivibrators.

When no light is striking a photo-transistor 11, a very high resistance is present in its collector-emitter circuit and, in fact it can be considered essentially an open circuit under these conditions. When light strikes a photo-transistor 11, a relatively low resistance is present in its collector-emitter circuit and, in fact, it can be considered essentially a short circuit thus connecting pin 2 to ground. This is a relatively short low signal due to pull-up resistors 20 which insure that pin 2 promptly returns to a high positive voltage corresponding to a no light condition at the phototransistors 11.

At this time, that is, on the excursion of a low condition at pin 2 due to light striking a photo-transistor 11, a timing cycle is initiated with capacitors 19 charging exponentially for an "on" time corresponding to the preselected time constant determined by the value of resistors 18 in ohms and capacitors 19 in farads. During this "on" time, the output of pin 3 is high, at approximately 12 volts. The output of pin 3 of each timing circuit 15 is connected to one side of a light emitting diode (LED) 21. As will be hereinafter described, under normal conditions the anode of each LED 21 will be connected to the 12 volt supply, so that each LED 21 will be off during the "on" time of each timing circuit 15.

Considering the circuitry just described, at the end of a timing cycle, pin 3 would go low before a new timing cycle would be initiated. As such, a flash of light would occur at each LED 21 even under normal driving conditions with the tires at a desirable pressure. To avoid this situation, each timing circuit 15 is made retriggerable so that the output of pin 3 will be high as long as the trigger inputs at pin 2 are repeated at intervals less than the "on" time, as predetermined by resistors 18 and capacitors 19. Each timing circuit 15 is retriggered by a pair of transistors 22 and 23. The base of each transistor 22 is connected to pin 2 of its respective timing circuitry 15 through resistors 24 which maintain a high resistance between pin 2 and ground while at the same time permitting a low voltage at pin 2, indicative of photo-transistor 11 receiving a light, to turn off the corresponding transistor 22. Each transistor 22 also has its emitter connected to ground and its collector connected to the 12 volt supply through current limiting resistors 25. When each transistor 22 thus becomes nonconducting, a high positive voltage will appear at the base of its associated transistor 23. The emitters of each transistor 23 are connected to ground and their collectors connected to their respective timing resistive-capacitive components 18 and 19. When the base of a transistor 23 goes positive, indicative that its associated transistor 22 is not conducting, transistor 23 becomes conductive providing a discharge path for its capacitor 19. Thus, each capacitor 19 is not permitted to charge up and as long as repeat trigger input signals are received at sufficiently short intervals at pin 2, the pin 3 output of timing circuits 15 will remain high prohibiting an LED 21 from turning on under normal pressure conditions.

With either of the front wheels of the vehicle providing a light pulse on each wheel revolution, a transistor 26 will be turned on by virtue of pin 3 of either timing circuit 15A or 15B being high. A path through isolation diodes 28A and 28B is provided through the base input resistor 29 of transistor 26. Similarly, with either of the rear wheels of the vehicle providing a light pulse on each wheel revolution, a transistor 30 will be turned on by virtue of pin 3 of either timing circuit 15C or 15D being high. A path through isolation diodes 28C and 28D is provided through the base input resistor 31 of transistor 30.

The emitter of transistor 26 is connected to the collector of transistor 30, the emitter of which is connected to position A of a double pole double throw toggle switch, indicated generally by the numeral 32. Switch 32 has three contact positions, the A position being the "run" position, the B position being the center "off" position, and the C position being a "test" position. A sound buzzer 33 is connected to pole 34 of switch 32 and the anode of each LED 21 is connected to pole 35 of switch 32. The emitter of transistor 30 is also connected through a diode 36 to pole 35 of switch 32. Under normal conditions, the 12 volt supply will be transmitted through a transistor 37 to the collector of transistor 26, and whenever transistor 26 and 30 are both conducting, 12 volts will also be present at the emitter of transistor 30. With the switch in the A position (run), 12 volts will thus be applied to the anode bus of each LED 21 and to buzzer 33 via poles 34 and 35, respectively.

When the vehicle is stopped the reflective surface on each wheel will normally not be aligned with the light source 12 and resistors 20 assure that pin 2 of each timing circuit 15 is receiving a high signal causing a corresponding low signal at the pin 3 output of each timing circuit 15. As such, transistors 26 and 30 will not conduct and the buzzer 33 will not sound nor will any LED 21 come on. Assuming the reflective surface 14 on any one wheel, for example, the left front wheel, should happen to line up with its light source 12 (a probability of one out of 360 since the angular alignment window at each wheel is about one degree of arc), the output of timing circuit 15A would go high turning on transistor 26. But since transistor 30 would not be turned on, the coincidental alignment of the reflective material on one wheel will not cause a false alarm. Nor, for that matter, would a false alarm occur if the reflective material would line up on the two front wheels or two rear wheels. While it is recognized that the coincidental alignment of the reflective material on a front and rear wheel could cause a false alarm, the probability of such is about one in 32,400 and as such is sufficiently remote so that for practical purposes it can be ignored. However, as would be evident to one skilled in the art, the principles of the anti-coincidence design just described could be expanded to cover all possible wheel combinations.

With the switch 32 in the A (run) position as shown in FIG. 1, under normal conditions 12 volts will be applied to the anode of each LED 21 and to buzzer 33 via poles 34 and 35 respectively, as previously described. As long as a periodic signal from each photo-transistor 11 is being received by each timing circuitry 15, indicative of satisfactory pressure conditions for all tires while the vehicle is running at normal speed, no light will be seen nor buzzer sounded. If any one of the tires, for example, the left front tire, has a pressure condition lower than the preselected value, the angular orientation of reflective surface 14 will be changed terminating the periodic signal for that tire and causing the output of its associated timing circuit 15A to go low. This turns on the corresponding LED 21A located on the instrument panel of the vehicle. Because the output of timing circuits 15B, 15C and 15D would still be high, transistors 26 and 30 would be conducting providing 12 volts through buzzer 33. Under these conditions buzzer 33 will sound because it has a path through isolation diodes 38, in this particular instance, through diode 38A. With the operator of the vehicle visually and audibly alerted to the low pressure condition in the left front tire, his movement of switch 32 to the off position B will take the 12 volt supply off the buzzer 33 to avoid any continued annoyance of the sound alarm while driving to a service area. However, LED 21A would continue on to remind the operator of the existance and location of the low pressure condition.

Switch 32 also has the test position C so that the operator of the vehicle can assure himself that the system is working properly. In this position, 12 volts is continuously supplied to the anode of each LED 21 via pole 35 of switch 32 and to the sound buzzer 33 via pole 34. Thus, in the test position with the vehicle stopped and with no reflective surface 14 aligned with a light source 12, the audio and visual alarms can be perceived even though transistors 26 and 30 are off. Diode 36 in the emitter circuit of transistor 30 blocks the 12 volt supply from being directed to transistors 26 and 30. While still in the test position, once the vehicle starts moving, light pulses will be received periodically by each phototransistor 11 causing the timer circuits 15 to go high for one "on" time. If the speed of the vehicle is such that the time interval between wheel revolutions is greater than the "on" time (very slow speed), each LED 21 will periodically flash and buzzer 33 will chirp. As the vehicle picks up speed, the flashing of the LED'S and sounding of the buzzer will cease. This positive test insures that all the electronic circuitry and the optical paths making up the system are functional.

The circuitry described thus far is perfectly satisfactory for operation when the vehicle is stopped or travelling at normal driving speeds. However, in situations where the vehicle is travelling at very low speeds, such as crawling in heavy traffic, each wheel may not go through one revolution within the "on" time of the timing circuitry 15.

This problem is solved by a low speed lockout circuitry, indicated generally by the numeral 40 in FIG. 1. If the "on" time for the timing circuits 15 is selected typically at 0.5 seconds (each resistor 18 being approximately 100 K ohms and each capacitor 19 being approximately 5 microfarads), and knowing that a speed of about 5 mph corresponds to one wheel revolution per second, then when slowing down to speeds under 10 mph the various timing circuits 15 will begin timing out. At this time, the pin 3 output of each timing circuit 15 abruptly goes from a high voltage condition to a low voltage condition and then back high again when the next light pulse is received. The transition from the high to low signal is used to trigger a time inhibit and delay circuit 41 which can be identical to the conventional circuits 15 previously described. As will now be described, the output of time inhibit and delay circuit 41 is used prevent the alarm signal under such conconditions.

Pin 2 of circuit 41 is normally kept at a high positive voltage by virtue of pullup resistor 42 connected to the supply voltage. Pin 8 is connected to the power supply; pin 1 is grounded; pin 5, which is not used in this application, is grounded through capacitor 43; reset pin 4 is connected to pin 2 so that the "on" cycle of circuit 41 is initiated whenever pin 2 goes high; pins 6 and 7 are connected to the junction of timing resistive-capacative components 44 and 45, respectively; and pin 3 represents the output of circuit 41.

When the signal from a timing circuit 15 goes low, capacitors 46 provide a spike through isolation diodes 48 to momentarily drive pin 2 of time delay circuit 41 low. Resistors 49 in parallel with capacitors 46 insure continuous inhibit action by discharging capacitors 46 at a slow rate. After pin 2 is momentarily driven low, pull-up resistor 42 immediately drives pin 2 high again which causes the output pin 3, which is normally low, to go high. Once the output of time inhibit and delay circuit 41 goes high, transistor 50 is turned on through base resistor 51. With transistor 50 conducting, transistor 37, which is normally on, as previously described, will be turned off since its base input signal, applied through resistors 52 and 53, will approach zero volts. With transistor 37 off, the power supply voltage is not transmitted to the collector of transistor 26 and alarm cannot occur. The time constant of the capacitor 45-resistor 44 network is chosen to be much longer than the "on" time of timing circuits 15 so that once a time out of a timing circuit 15 has occurred, the alarm will be inhibited for a certain period. With the "on" time of circuits 15 of 0.5 seconds, as previously assumed, a time delay of 5 seconds by circuit 41 has been found satisfactory. When transistor 50 is turned off by virtue of the return of pin 3 of circuit 41 to its normal low condition, the collector of transistor 50 will be at a high voltage by virtue of pull-up resistor 52. With transistor 50 off, transistor 37 will be on by virtue of a positive base input signal applied through resistors 52 and 53 and the 12 volt supply is transmitted through the collector-emitter circuit of transistor 37 to the collector of transistor 26 thus permitting the alarm to occur. Since with each new trigger input signal received at time inhibit and delay circuit 41, a new delay period is initiated, it should be evident that as long as repeat time-out signals are occurring at the various wheel positions, indicative of a crawling vehicle, alarm cannot occur. However, a low pressure condition encountered while running at normal driving speeds will still be detected because it will initiate a single time delay period by virtue of circuit 41 after which buzzer 33 will sound and an LED 21 will light in the usual manner.

Another situation which could cause a false alarm could arise when first starting up from a stopped position. If a front and rear wheel photo-transistor are immediately activated followed nearly simultaneously by application of the brakes so that at least one of the other photo-transistors has not been activated, both transistors 26 and 30 will turn on for up to one "on" time of timing circuitry 15. The non-activated photo-transistor results in a low output of its associated timing circuitry 15 providing an alarm path for the electrical signal.

This situation is averted by providing a transistor 60 at the cathodes of diodes 28C and 28D, that is, at the output of timing circuits 15C and 15D. A high signal from circuits 15C or 15D not only turns on transistor 30 but also turns on transistor 60 through base resistor 61. The collector of transistor 60, which is normally at a high positive voltage by virtue of pull-up resistor 62 connected to the power supply, will be pulled to near ground potential since its emitter is grounded. The collector of transistor 60 is also capacitively coupled, as by capacitor 63, to the trigger input (pin 2) of the time delay circuit 41. As such, a trigger pulse will be transmitted through isolation diode 64 to pin 2 and will occur simultaneously with the collector of transistor 60 going low. Resistor 65 in parallel with capacitor 63 is provided to prevent capacitor 63 from maintaining its charge indefinitely. This operation of transistor 60 assures that even on start-up of the vehicle followed by immediate braking, a false alarm will not occur.

Figure 3:
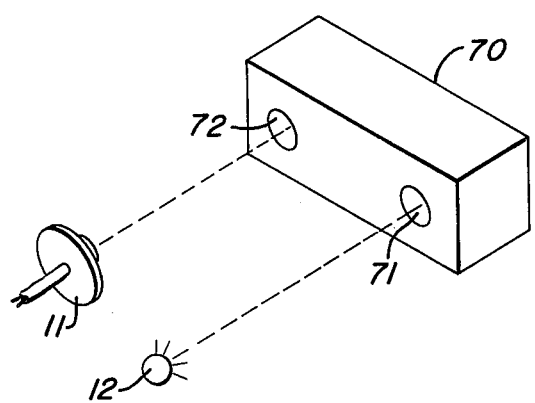
FIG. 3 is a pictorial illustration of another embodiment of that shown in FIG. 2.
Figure 4:
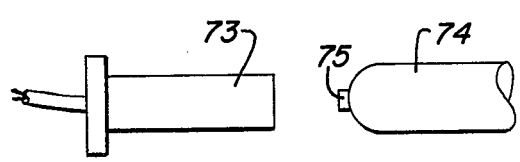
FIG. 4 is a pictorial illustration of another embodiment of that shown in FIGS. 2 and 3.
Figure 5:
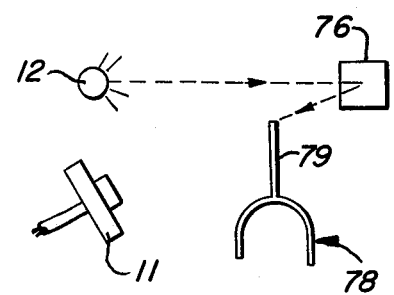
FIG. 5 is a pictorial illustration of another embodiment of that shown in FIGS. 2, 3 and 4.

The circuit of FIG. 1 is thus operable to alert the operator of a vehicle of a low pressure condition in any one of the tires during all types of driving conditions. The triggering of the entire circuit is obtained by a signal on pin 2 of each timing circuit 15 with the presently preferred form being that shown in FIG. 2. However, it should be evident that numerous types of triggering devices would properly operate the FIG. 1 circuits. Some alternative embodiments are shown in FIGS. 3–5. For example, in FIG. 3 the stationary phototransistor 11 and stationary light source 12 are still employed but a different type of pressure switch, indicated by the numeral 70, is utilized. Switch 70 communicates with the internal pressure of the tire and includes therein a prism which receives light through window 71 and normally sends light back out through window 72. When the pressure drops below a predetermined value, the light will not be reflected out window 72 to the phototransistor 11 and the circuit of FIG. 1 goes into operation to alert the operator of the low pressure condition.

Figure 4A:
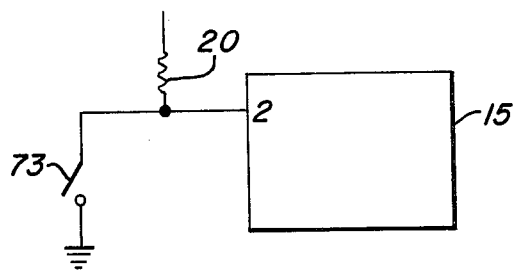
FIG. 4A is a schematic diagram of the manner in which the circuitry of FIG. 1 is altered for use in conjunction with the FIG. 4 embodiment.

In the FIG. 4 embodiment a commercially available proximity switch 73 replaces the photo-transistor 11 and is mounted on some stationary part of the vehicle near the wheel. A plunger 74 having a magnetic tip 75 communicates with the internal pressure of the tire and closes the proximity switch 73 on each revolution of the tire when pressure conditions are normal. When the pressure drops below a predetermined value, the switch 73 will not be activated as the magnetic tip 75 is moved away from switch 73. FIG. 4A shows the manner in which the circuit of FIG. 1 would be altered if the FIG. 4 embodiment were used. Quite simply, the switch 73 would merely replace photo-transistor 11.

Figure 5A:
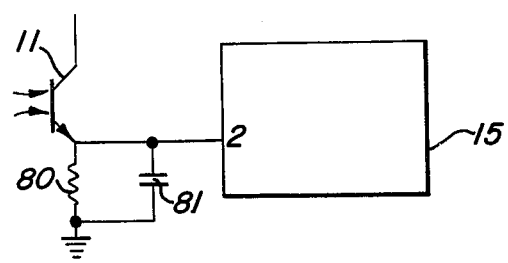
FIG. 5A is a schematic diagram of the manner in which the circuitry of FIG. 1 is altered for use in conjunction with the FIG. 5 embodiment.

In the FIG. 5 embodiment again the photo-transistor 11 and light source 12 are employed and mounted on a stationary surface near the wheel. A mirror 76 is also mounted on the wheel of the vehicle but is fixed in angular orientation in a position so that light will be reflected from the source 12 to photo-transistor 11. A pressure sensitive interrupter, generally indicated by the numeral 78, includes a tongue 79 that normally blocks the light from being received at photo-transistor 11. Upon a pressure condition below a predetermined value, the interrupter tongue 79 retracts and light pulses are received by photo-transistor 11. Thus, this trigger works in an opposite fashion from those previously described, that is, a light indicates a pressure problem and a no-light condition indicates satisfactory pressure. To accommodate for this reverse situation, one way in which the FIG. 1 circuitry could be modified is shown in FIG. 5A. Resistors 20 are replaced by resistors 80 connected to ground and capacitors 81 connected in parallel with resistors 80. Thus, when no light is hitting the photo-transistor 11, it will be in a nonconducting state and pin 2 of circuitry 15 will be at a low voltage by virtue of resistor 80. When tongue 79 retracts, pin 2 will go high and will be kept high by virtue of capacitor 81 and the circuit 15 will operate as described in conjunction with FIG. 1.

As previously described, the circuit of FIG. 1 is suitable for monitoring for abnormal conditions in numerous rotatable members, the low pressure abnormality in a rotating tire having been chosen as representative of one of the more complex situations. In machinery where speed of a rotating member is critical, the reflective surface could be fixed to the rotating member by a spring arrangement with the angular orientation of the rotating member being designed to change when the member dropped below or went above a predetermined speed. Again a stationary light source and photo-transistor could be used in this situation to trigger an alarm circuit such as that shown in FIG. 1, although it should be evident that many of the details of the FIG. 1 circuit which were directed to the multiple rotating tire circumstance could be omitted.

It should thus be evident that the apparatus described herein can monitor rotatable members, such as a pneumatic tire, for abnormal conditions, such as low pressure, and alert the operator of such conditions, thus substantially improving the alarm control art and otherwise accomplishing the objects of the present invention.

I claim:

1. Apparatus for indicating an abnormal condition in a rotatable member comprising, sensing means capable of providing periodic signals indicative of a normal condition of the rotatable member, the absence of said periodic signals being indicative of an abnormal condition of the rotatable member, timing means receiving said periodic signals to provide a first output signal indicative of a normal condition of the rotatable member as long as said periodic signals are received within a predetermined time period and recognizing the absence of said periodic signals to provide a second output signal indicative of an abnormal condition of the rotatable member, and indicator means receiving said first and second output signals of said timing means and indicating the abnormal condition upon the occurrence of a said second output signal.

2. Apparatus for indicating an abnormal condition in a rotatable member comprising; sensing means capable of providing periodic first signals indicative of a normal condition of the rotatable member and a second signal indicative of an abnormal condition of the rotatable member; said sensing means including a light source stationarily mounted adjacent the rotatable member and providing a beam of light, a mirror mounted on the rotatable member to receive the beam of light; photo-transistor means stationarily mounted adjacent the rotatable member, the beam of light normally being transmitted by said mirror to said photo-transistor means upon each revolution of the rotatable member to provide said periodic first signals of said sensing means, and means responsive to an abnormal condition in the rotatable member to change the angular mounting of said mirror on the rotatable member to prevent transmission of the beams of light to said phototransistor means to provide said second signal of said sensing means; timing means receiving said periodic first signals of said sensing means to provide a first output signal indicative of a normal condition of the rotatable member as long as said periodic first signals are received within a predetermined time period and receiving said second signal of said sensing means to provide a second output signal indicative of an abnormal condition of the rotatable member; and indicator means receiving said first and second output signals of said timing means and indicating the abnormal condition upon the occurrence of a said second output signal.

3. Apparatus according to claim 1 wherein said sensing means includes switch means mounted adjacent the rotatable member and means responsive to the condition of the rotatable member to periodically close said switch means to provide said periodic signals and to leave said switch means open to establish the absence of said periodic signals indicative of an abnormal condition.

4. Apparatus according to claim 1 wherein said timing means includes a monostable multivibrator triggered by said periodic signals of said sensing means, and means to retrigger said monostable multivibrator to provide the first output signal of said timing means.

5. Apparatus according to claim 4, said timing means further including a capacitor, and wherein the predetermined time period is determined by the charging rate of said capacitor, said means to retrigger prohibiting said capacitor from charging up.

6. Apparatus according to claim 1 wherein the rotatable member is a pneumatic tire and the abnormal condition is an internal pressure below a predetermined value.

7. Apparatus for indicating when the internal pressure of any of a plurality of pneumatic tires on a vehicle falls below a predetermined value comprising, sensing means for each tire capable of providing periodic signals indicative of an internal pressure in the tire above the predetermined value, the absense of said periodic signals being indicative of an internal pressure in the tire below the predetermined value, timing means for each sensing means receiving said periodic signals of its said sensing means to provide a first output signal indicative of a pressure in the pneumatic tire above the predetermined value as long as said periodic signals are received within a predetermined time period and recognizing the absence of said periodic signals to provide a second output signal indicative of an internal pressure in the tire below the predetermined value, and indicator means receiving said first and second output signals of said timing means to indicate when the internal pressure of a tire is below the predetermined value.

8. Apparatus according to claim 7 wherein the periodic signals of said sensing means occur once each revolution of the tire and the second signal of said timing means will normally occur when the tire is not rotating and further comprising means to prevent false alarms when the tire is not rotating.

9. Apparatus according to claim 7 wherein there are four tires on the vehicle, two front tires and two rear tires, and further comprising first transistor means receiving the signals from the timing means of the two front tires, said first transistor means conducting upon receiving said first output signal of said timing means of either of the two front tires, and second transistor means receiving the signals from the timing means of the two rear tires, said second transistor means conducting upon receiving said first output signal of said timing means of either of the two rear tires, said first output signal of each said timing means being prohibited from being received by said indicator means when either of said transistor means is nonconducting.

10. Apparatus according to claim 7 wherein said indicator means includes a single sound buzzer for all tires and a light for each tire.

11. Apparatus according to claim 10 further comprising switch means to turn off said buzzer.

12. Apparatus according to claim 7 including means to prevent said second output signal of said timing means from activating said indicator means should said predetermined time period be shorter than the time between the periodic signals of said sensing means.

13. Apparatus according to claim 12, wherein said means to prevent causes a time delay before said second output signal of said timing means activates said indicator means.

14. Apparatus according to claim 13, said timing means including a capacitor and wherein the predetermined time period is determined by the charging rate of said capacitor, and said means to prevent includes a capacitor, the time delay being determined by the charging rate of said capacitor of said means to prevent, the charging rate of said capacitor of said means to prevent being slower than the charging rate of said capacitor of said timing means.

15. Apparatus according to claim 13 wherein said means to prevent is normally triggered when the output signal of said timing means goes from said first output signal to said second output signal.

16. Apparatus according to claim 15 further comprising means to trigger said means to prevent when the output signal of said timing means goes from said second output signal to said first output signal indicative of initial rotation of the tires.

17. Apparatus for indicating when the internal pressure of any of a plurality of pneumatic tires on a vehicle falls below a predetermined value comprising; a power supply providing a voltage output; circuit means for each tire connected to said power supply and providing a first voltage output approximately corresponding to the output of said power supply when the internal pressure of a tire is above the predetermined value and a second output voltage approaching ground when the internal pressure of a tire is below the predetermined value; said circuit means including sensing means for each tire responsive to the internal pressure of the tire and providing an output signal indicative thereof, and timing means for each tire receiving the output signal of said sensing means and providing the output signals of said circuit means; each said sensing means including a light source stationarily mounted adjacent each tire and providing a beam of light, reflecting means mounted on the rotatable member to receive the beam of light, photo-transistor means stationarily mounted adjacent each tire and capable of receiving the beam of light from said reflecting means to provide said output signal, and means responsive to the internal pressure of the tire to change the annular orientation of said reflecting means so that said beam of light will not be transmitted to said photo-transistor; an indicating light for each tire connected between said power supply and said output of each said circuit means and glowing when the output of its said circuit means is said second output voltage; and sound means connected between said power supply and the output of each said circuit means to provide an audible alarm when the internal pressure of a tire is below the predetermined value.

18. Apparatus according to claim 17 further comprising switch means between said power supply and said sound means and between said power supply and each said indicating light, said switch means being operative to remove the voltage of said power supply from said sound means while at the same time maintaining the voltage of said power supply connected to each said indicating light.

19. Apparatus according to claim 18 further comprising transistor means connected between said circuit means and said switch means and rendered conductive upon receipt of said first voltage output from said circuit means of at least one tire.

20. Apparatus according to claim 19 wherein said switch means includes a test position to bypass said transistor means and activate the audible alarm of said sound means and activate each indicating light.

21. Apparatus for indicating when the internal pressure of any of a plurality of pneumatic tires on a vehicle falls below a predetermined value comprising; a power supply providing a voltage output; circuit means for each tire connected to said power supply and providing a first voltage output approximately corresponding to the output of said power supply when the internal pressure of a tire is above the predetermined value and a second output voltage approaching ground when the internal pressure of a tire is below the predetermined value; said circuit means including sensing means for each tire responsive to the internal pressure of the tire and providing an output signal indicative thereof, and timing means for each tire receiving the output signal of said sensing means and providing the output signals of said circuit means; each said sensing means including a light source stationarily mounted adjacent each tire and providing a beam of light, reflecting means mounted on the rotatable member to receive the beam of light, photo-transistor means stationarily mounted adjacent each tire and capable of receiving the beam of light from said reflecting means to provide said output signal, and means responsive to the internal pressure of the tire to interrupt the beam of light so that it will not be transmitted to said photo-transistor; an indicating light for each tire connected between said power supply and said output of each said circuit means and glowing when the output of its said circuit means is said second output voltage; and sound means connected between said power supply and the output of each said circuit means to provide an audible alarm when the internal pressure of a tire is below the predetermined value.

* * * * *

Disclaimer

4,086,564.—*William Eugene Claxton*, Mogadore, Ohio. ELECTRONIC ALARM CIRCUITRY. Patent dated Apr. 25, 1978. Disclaimer filed Nov. 14, 1979, by the assignee, *The Firestone Tire & Rubber Co.*

Hereby enters this disclaimer to claims 1, 3, 6, 7, 10 and 11 of said patent.

[*Official Gazette, March 18, 1980.*]